UNITED STATES PATENT OFFICE.

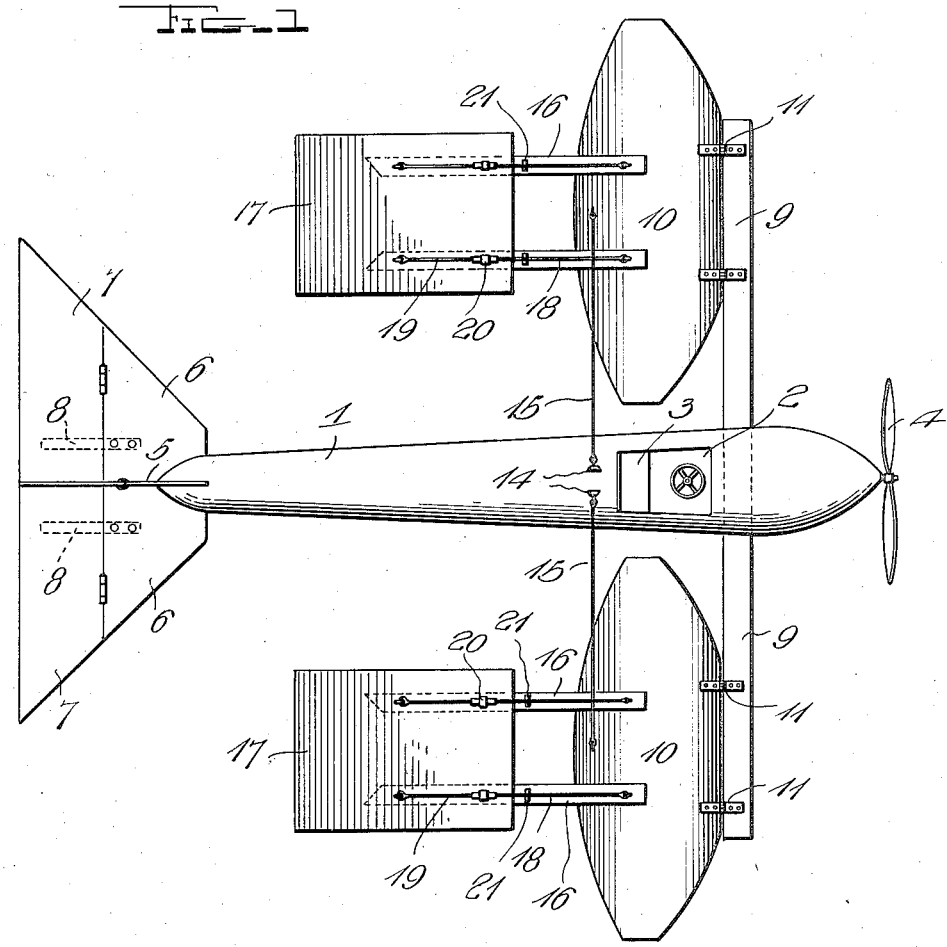
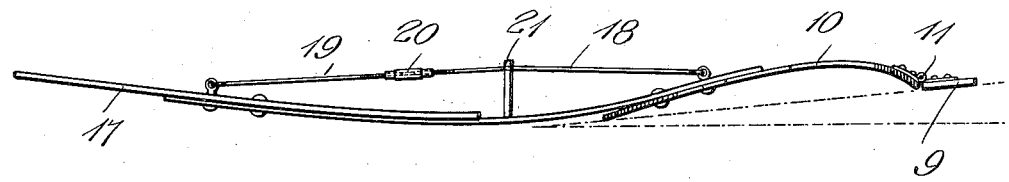

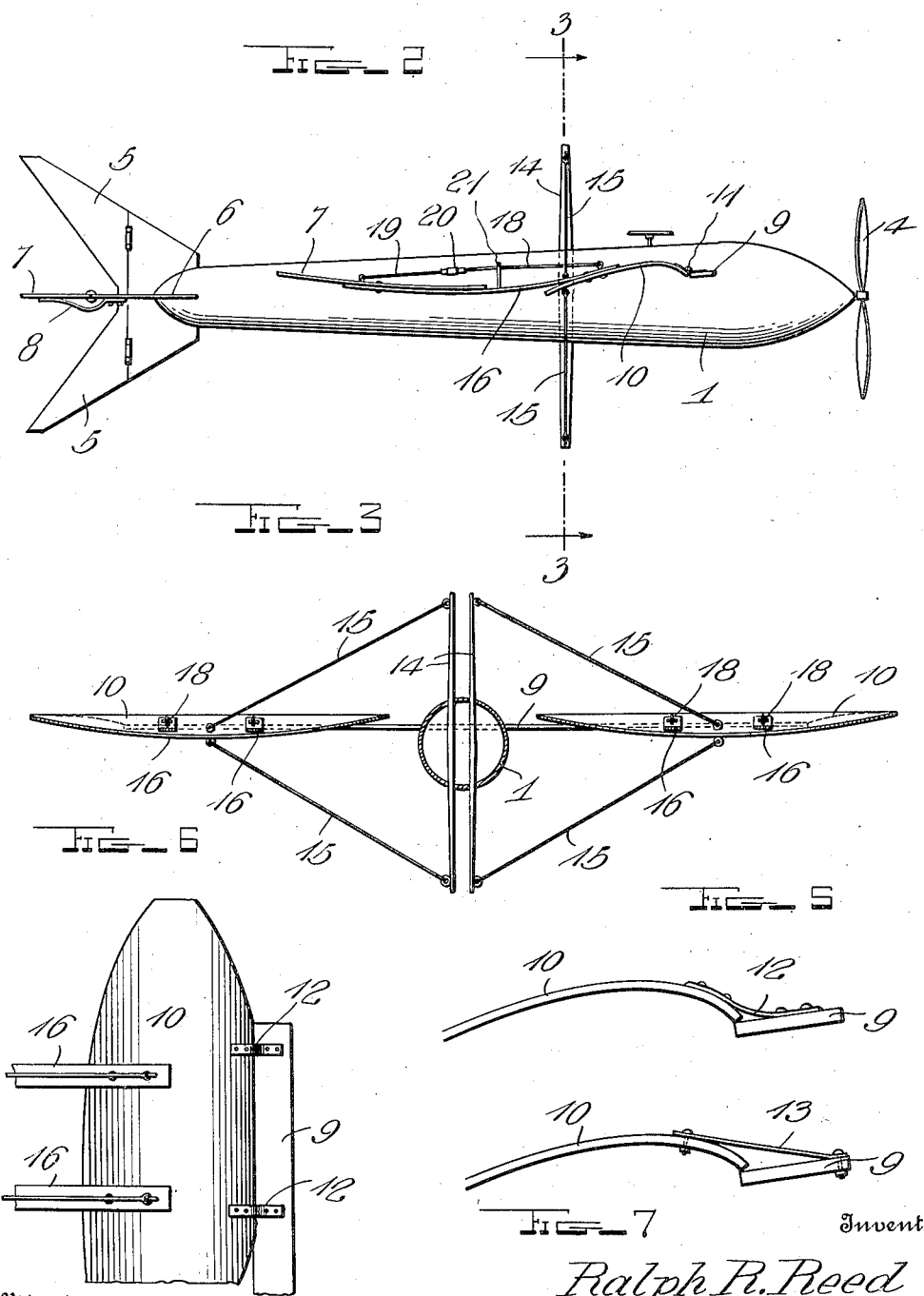

RALPH R. REED, OF OAKLAND, CALIFORNIA.

AEROPLANE.

1,094,249.   Specification of Letters Patent.   Patented Apr. 21, 1914.

Application filed April 10, 1913. Serial No. 760,311.

*To all whom it may concern:*

Be it known that I, RALPH R. REED, a citizen of the United States, residing at Oakland, in the county of Alameda and State of California, have invented certain new and useful Improvements in Aeroplanes; and I do declare the following to be a full, clear, and exact description of the invention, such as will enable others skilled in the art to which it appertains to make and use the same.

This invention relates to improvements in aeroplanes.

The primary object of the invention is to automatically secure and maintain stability in an aeroplane while in flight.

Another object is to provide an aeroplane having an improved construction and arrangement of wings and following planes and means whereby they are attached to the body of the aeroplane to obtain the desired results.

With these and other objects in view, the invention consists of certain novel features of construction, and the combination and arrangement of parts as will be more fully described and claimed.

In the accompanying drawings: Figure 1 is a plan view of an aeroplane constructed in accordance with my invention; Fig. 2 is a side view thereof; Fig. 3 is a vertical cross section taken on the line 3—3 of Fig. 2; Fig. 4 is an enlarged side view of one of the wings and following planes of the machine; Fig. 5 is a detail side view of a portion of one of the wings showing a modified construction of the hinged connection thereof; Fig. 6 is a plan view of the wing and hinged connection shown in Fig. 5; Fig. 7 is a view similar to Fig. 5 showing another method of connecting the wing to the body of the aeroplane.

My improved aeroplane comprises a body 1 which may be of any suitable shape and constructed in any suitable manner, said body being here shown as of substantially cigar shape and as having formed therein near its forward end a pit 2 in which is arranged an operator's seat 3. On the forward end of the body is operatively mounted in any suitable manner a propeller 4 while on the rear end of the body is arranged a vertical rudder 5, and a horizontal rudder 6. The rudders 5 and 6 may be of any suitable construction and are here shown as having rigid sections and hinged sections which may be controlled in any suitable manner. The outer hinged section 7 of the horizontal rudder 6 is yieldingly held in a horizontal position by flat springs 8 secured at their inner ends to the fixed section of the rudder 6 and having their outer ends engaged with the outer side of the hinged section 7 whereby a sudden dive of the machine is prevented, if for any reason the controlling mechanism should become inoperative.

Arranged transversely through the body of the aeroplane near the forward end thereof is a wing supporting bar 9 the ends of which project suitable distances beyond the opposite sides of the body 1. The bar 9 is preferably set at a slight angle or has its forward edge projecting upwardly at a slight angle as shown. Hinged or flexibly connected to the rear edge of the opposite ends of the bar 9 are curved wings 10 of any suitable construction, said wings being preferably shaped as shown in Fig. 1 of the drawings and as having the curvature shown in Figs. 2 and 4 of the drawings. In Figs. 1, 2 and 4 of the drawings the wings 10 are shown as attached to the bar 9 by hinges 11, while in Figs. 5 and 6 the wing is shown as connected with the bar 9 by flexible or spring metal straps 12 which yield to permit the upward swinging movement of the wing. In Fig. 7, the wing is shown as being rigidly connected to the bar 9 by an inflexible bar or strap 13 and in this instance the torsional action of the bar 9 is depended upon to obtain the desired upward or tilting movement of the wings.

Arranged vertically through the body 1 a short distance in rear of the operator's seat and secured in the body in any suitable manner are flexible struts 14 which project a suitable distance above and below the body and which have their upper and lower ends connected respectively with the upper and lower sides of the wings by tension cords or cables 15 which yieldingly or flexibly support the wings and the parts carried by the latter whereby the wings are held in position and are permitted to operate in a manner hereinafter described.

Rigidly secured at their forward ends to the upper sides of the wings are pairs of parallel rearwardly extending flexible plane supporting bars 16 to the upper side of the rear ends of which are rigidly secured following planes 17 constructed of any suitable material and which are here shown as preferably of rectangular shape. The bars 16 terminate short of the rear ends of the planes 17, thus leaving said ends free to yield slightly when under air pressure. The planes 17 are adjusted in the line of travel by means of tension rods 18 and 19 the outer ends of which are connected respectively with the forward ends of the plane supporting bars 16 and adjacent parts of the wings and with the rear ends of said bars 16 and adjacent portions of the following planes as clearly shown in Fig. 4 of the drawings. The inner ends of the rods 18 and 19 are threaded, one of said ends being provided with right hand threads and the other with left hand threads and with said threaded ends are engaged right and left hand threaded turn buckles 20 whereby the rods may be taken up or let out to vary or adjust the curvature of the plane supporting bars 16 and the upward inclination of the planes 17 as shown. The rods 18 are engaged with struts 21 arranged on the bars 16 near the inner ends of the planes, said struts and tension rods thus also forming truss braces for the planes and wings. The effect of adjusting or tilting the planes 17 upwardly at their rear ends by the tension rods in the manner described is to bring more air pressure upon the top surface of these planes when the aeroplane is in flight in a forward direction thereby increasing the angle of incidence. It will be understood of course that this adjustment of the planes is obtained before the flight begins and should not be confused with the tilting of the wings and planes on the pivotal connections of the wings, resulting from pressure beneath the latter as will be hereinafter described.

By hingedly or flexibly connecting the wings 10 to the bar 9 and through the latter to the body of the machine in the manner described, it will be seen that the pressure of the air beneath the wings would tend to tilt or swing the latter upwardly on their pivotal or flexible connections and in order to automatically control this upward swinging or tilting movement of the wings, I provide the following planes 17 which are connected to the wings in the manner described and which, while allowing the wings a slight upward rotative movement centering always at a point in advance of the center of the upward pressure of the air, said planes will limit or prevent the wings from tilting upwardly beyond the angle of incidence. The planes 17 act as levers and the center of the upward pressure of the air beneath the wings serves as a fulcrum for these levers while the body carried by the wings constitutes the load. In this arrangement the pressure of the air against the upwardly inclined rear portion of the planes resulting from the forward progress or flight of the aeroplane serves as the power on the lever action of the planes and has the tendency of forcing the planes downwardly and the forward ends of the wings upwardly, thus automatically restoring the stability or equilibrium of the aeroplane. It will thus be seen that when excessive pressure exists or occurs beneath the wing on either side of the machine that this wing will be swung upwardly thus tilting its following plane until the increased air pressure upon the top surface of the plane stops the upward movement of the wing. It will also be seen that the stronger the up thrust beneath the wing, the greater will be the down thrust on the upper side of the plane. It will be understood that the pressure of the air on the planes is due to the forward motion of the aeroplane and pressure will be produced whether the machine is being driven in a forward direction by a propeller or is moving downwardly by gravity.

From the foregoing description taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as claimed.

Having thus described my invention, what I claim is:

1. In an aeroplane, a body, a wing supporting bar secured thereto, supporting wings having a flexible connection with said bar in advance of the center of the upthrust of the air, means to yieldingly hold the rear portions of the wings in position, following planes operatively connected with said wings, and means to adjust the curvature of said planes in the direction of the line of flight.

2. In an aeroplane, a body, a wing supporting bar secured thereto, wings having a flexible connection at their forward edges with said bar in advance of the center of the upthrust of the air, flexible struts arranged through the body of the aeroplane, cords to connect the ends of said struts with the upper and lower sides of the wings, plane supporting bars secured to said wings, following planes secured to said bars, and means to adjust the curvature of said planes in the direction of the line of flight.

3. In an aeroplane, a body, a wing supporting bar arranged therethrough, supporting wings flexibly connected with said bar in advance of the center of the upthrust of the air, said wings being curved transversely to the direction of movement of the aeroplane, flexible plane supporting bars secured to and projecting rearwardly from said wings, following planes secured to the rear ends of said bars, said planes having flexible rear ends, tension rods secured at their outer ends to the ends of said plane supporting bars and having right and left hand threaded inner ends, turn buckles engaged with said threaded ends, and struts arranged beneath said rods.

4. In an aeroplane, a body, a wing supporting bar secured thereto, wings having a flexible connection with said bar, flexible struts extending through said body, cords connecting the ends of said struts with the lower and upper faces of the wings, following planes secured to said wings, and means for adjusting the curvature of said planes in the direction of the line of flight.

In testimony whereof I have hereunto set my hand in presence of two subscribing witnesses.

RALPH R. REED.

Witnesses:
JOHN W. PHINE,
S. HUNTING.